United States Patent
Chang et al.

(10) Patent No.: US 10,783,037 B2
(45) Date of Patent: Sep. 22, 2020

(54) DATA STORAGE DEVICE, HOST DEVICE FOR DATA STORAGE DEVICE OPERATIONS, AND DATA WRITING METHOD

(71) Applicant: Silicon Motion, Inc., Jhubei, Hsinchu County (TW)

(72) Inventors: Ming-Hung Chang, Zhubei (TW); Kuo-Yuan Hsu, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 23 days.

(21) Appl. No.: 16/170,249

(22) Filed: Oct. 25, 2018

(65) Prior Publication Data

US 2019/0171522 A1 Jun. 6, 2019

(30) Foreign Application Priority Data

Dec. 6, 2017 (TW) .............................. 106142715 A (51) Int. Cl.
*G06F 11/00* (2006.01)
*G06F 11/10* (2006.01)
*G06F 12/1009* (2016.01)

(52) U.S. Cl.
CPC ...... *G06F 11/1076* (2013.01); *G06F 12/1009* (2013.01); *G06F 2212/1032* (2013.01); *G06F 2212/262* (2013.01); *G06F 2212/657* (2013.01)

(58) Field of Classification Search
CPC ............. G06F 11/1076; G06F 12/1009; G06F 2212/1032; G06F 2212/262
See application file for complete search history.

(56) References Cited

U.S. PATENT DOCUMENTS

| | | | | |
|---|---|---|---|---|
| 7,392,458 B2* | 6/2008 | Forhan | ................ | G06F 11/1076 711/114 |
| 7,779,335 B2* | 8/2010 | Forhan | ................ | G06F 11/1076 711/114 |
| 8,850,113 B2* | 9/2014 | Baptist | ................ | G06F 11/1076 711/114 |
| 9,548,108 B2* | 1/2017 | Yu | ................ | G11C 16/3431 |
| 9,720,770 B2* | 8/2017 | Zhou | ................ | G06F 11/108 |
| 9,812,224 B2* | 11/2017 | Yun | ................ | G06F 11/1012 |
| 9,910,786 B2* | 3/2018 | Freyensee | ................ | G06F 12/10 |
| 10,218,789 B2* | 2/2019 | Yang | ................ | G06F 11/1068 |

(Continued)

FOREIGN PATENT DOCUMENTS

| | | |
|---|---|---|
| CN | 101772807 A | 7/2010 |
| TW | 200903260 A | 1/2009 |

(Continued)

*Primary Examiner* — Esaw T Abraham
(74) *Attorney, Agent, or Firm* — McClure, Qualey & Rodack, LLP (57) ABSTRACT

A data storage device with fault-tolerant design. The data storage device has a RAID (Redundant Array of Independent Disks) engine that generates RAID checking code for user data requested in a write command. The user data is programmed to a non-volatile memory according to a target physical address indicated in the write command. The RAID checking code is programmed to the non-volatile memory according to a reserved physical address. The user data and the RAID checking code are programmed to a stripe of pages within a stripe of blocks.

13 Claims, 4 Drawing Sheets

(56) References Cited

U.S. PATENT DOCUMENTS

| | | | |
|---|---|---|---|
| 10,346,059 B2* | 7/2019 | Hsu-Hung | G06F 3/064 |
| 10,372,541 B2* | 8/2019 | Hyun | G06F 3/0665 |
| 10,521,152 B2* | 12/2019 | Park | G06F 11/10 |
| 10,540,231 B2* | 1/2020 | Camp | G06F 3/0619 |
| 2013/0304970 A1* | 11/2013 | Parizi | G06F 3/0619 |
| | | | 711/103 |

FOREIGN PATENT DOCUMENTS

| | | |
|---|---|---|
| TW | 201013400 A | 4/2010 |
| TW | 201432702 A | 8/2014 |

\* cited by examiner

|  | LUN#0 | LUN#1 | LUN#2 | LUN#3 | LUN#4 | LUN#5 | LUN#6 | LUN#7 |
|---|---|---|---|---|---|---|---|---|
| Blk_Stripe#0 | BLK#0 | 0 | 0 | 0 | 0 | 0 | 0 | 0 |
| Blk_Stripe#1 | BLK#1 | 0 | 0 | 0 | 0 | 0 | 0 | 0 |
| Blk_Stripe#2 | BLK#2 | 0 | 0 | 1 | 0 | 0 | 0 | 0 |
| ... | ... | ... | ... | ... | ... | ... | ... | ... |

DATA STORAGE DEVICE, HOST DEVICE FOR DATA STORAGE DEVICE OPERATIONS, AND DATA WRITING METHOD

CROSS REFERENCE TO RELATED APPLICATIONS

This Application claims priority of Taiwan Patent Application No. 106142715, filed on Dec. 6, 2017, the entirety of which is incorporated by reference herein.

BACKGROUND OF THE INVENTION

Field of the Invention

The present invention relates to data storage devices and methods for operating a non-volatile memory.

Description of the Related Art

There are various forms of non-volatile memory (NVM) for long-term data retention, such as flash memory, magnetoresistive RAM, ferroelectric RAM, resistive RAM, spin transfer torque-RAM (STT-RAM), and so on.

A non-volatile memory may be combined with a controller to form a data storage device to be accessed by a host. How to strengthen the fault tolerance of such data storage devices is an important issue in the technical field.

BRIEF SUMMARY OF THE INVENTION

A data storage device in accordance with an exemplary embodiment of the disclosure has a non-volatile memory and a microcontroller. The microcontroller includes a redundant array of independent disks (RAID) engine that encodes user data to generate RAID checking code. The user data is indicated by a write command. The microcontroller programs the user data to the non-volatile memory according to a target physical address indicated by the write command, and programs the RAID checking code to the non-volatile memory according to a reserved physical address. The user data and the RAID checking code are programmed to a stripe of pages of a stripe of blocks.

A host device controlling operations of a data storage device in accordance with an exemplary embodiment is disclosed. The host device operates the data storage device to store user data according to a target physical address and stores redundant array of independent disks (RAID) checking code according to a reserved physical address. Based on a block status table, the host device determines a logical unit number (LUN) to set the reserved physical address.

In another exemplary embodiment, a data writing method is disclosed, which includes the following steps: receiving a write command; generating redundant array of independent disks (RAID) checking code for user data indicated by the write command; programming the user data to a non-volatile memory according to a target physical address indicated by the write command; receiving a RAID checking code programming command; and in response to the RAID checking code programming command, programming the RAID checking code to the non-volatile memory according to a reserved physical address. The user data and the RAID checking code are programmed to a stripe of pages of a stripe of blocks.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. A non-volatile memory may be used to implement a data storage device or a data center. The following discussion is regarding flash memory in particular as an example.

A flash memory is often used as a storage medium in today's data storage devices, for implementations of a memory card, a USB flash device, an SSD and so on. In another exemplary embodiment, a flash memory is packaged with a controller to form a multiple-chip package and named eMMC.

A data storage device using a flash memory as a storage medium can be applied to a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device. The storage media uses a communication interface (or communication protocol) compatible with the host side to exchange or transfer commands or data.

A data center may be built with flash memories as the storage medium. For example, a server may operate an array of SSDs to form a data center. The server may be regarded as a host that operates the SSDs to access the flash memories within the SSDs.

The host distinguishes the flash memory storage contents by logical addresses (for example, according to a logical block address LBA or a global host page number GHP, etc.). A flash memory is generally divided into a plurality of blocks. Each block includes a plurality of pages. Each page, e.g. 16 KB of data, may be further divided into several storage units. The size of each storage unit is preferably equal to the segment size of user data, for example, 4 KB. In order to optimize the performance of the flash memory, the physical space of the flash memory is dynamically allocated to correspond to the host-identified logical addresses. A mapping table, L2P, is required to manage the mapping relationship between logical addresses at the host side and physical space of the non-volatile memory. When a (blank) block is selected to store user data as an active block, a mapping table P2L is generated for the active block to record the logical addresses of the user data stored at the different physical addresses of the active block. When the active block is closed to finish receiving user data, the mapping table P2L is written to the active block at a specified address (for example, programmed to the last page of the active block). The closed active block is regarded as a data block and does not further receive data.

In order to reduce the size of the mapping table L2P, the mapping table L2P is preferably indexed along logical addresses. Along the indexes, physical information corresponding to the data of the different logical addresses is simply maintained by the mapping table L2P. In order to reduce the size of the mapping table P2L, the mapping table P2L is preferably indexed along physical addresses. Along the indexes, logical addresses of the data stored at the different physical addresses are simply maintained by the mapping table P2L.

Various operations of the flash memory need to refer to or change the contents of the mapping table L2P. For example, the reading of flash memory needs to refer to the mapping table L2P, and the writing of flash memory needs to update the mapping table L2P. To reuse a storage space of a flash memory, the dirty space has to be erased in block units. Since there is an upper limit for the erasures that each block can withstand, the issue of wear leveling needs to be considered in flash memory operations. In addition, data updating is not rewriting the same space. The newer version of data is written to a spare space and the old data is regarded as invalid. A block may sporadically retain valid data, so the demand for garbage collection is correspondingly generated. Sporadic valid data retained by a block is moved to an active block by garbage collection. The block with only invalid data left can be erased and released as a spare block waiting to be reused as an active block. The techniques of wearing leveling and garbage collection involve mapping table L2P management. Even other technologies that promote the operational efficiency of flash memory may also be related to the mapping table L2P. How to ensure the accuracy of the mapping table L2P without affecting the system efficiency is an important issue in the technical field.

To improve the correctness of storage data, a Redundant Array of Independent Disks (RAID) system may be applied, in which user data is stored with RAID checking code. In this way, when the user data is damaged, the host or the microcontroller repairs the damaged user data based on the RAID checking code. The correctness of the stored user data, therefore, is guaranteed.

However, the generation of RAID checking code takes time and affects system performance. In the present invention, a method and device for data storage are proposed, taking into account the correctness of user data as well as the system performance.

Figure 1:
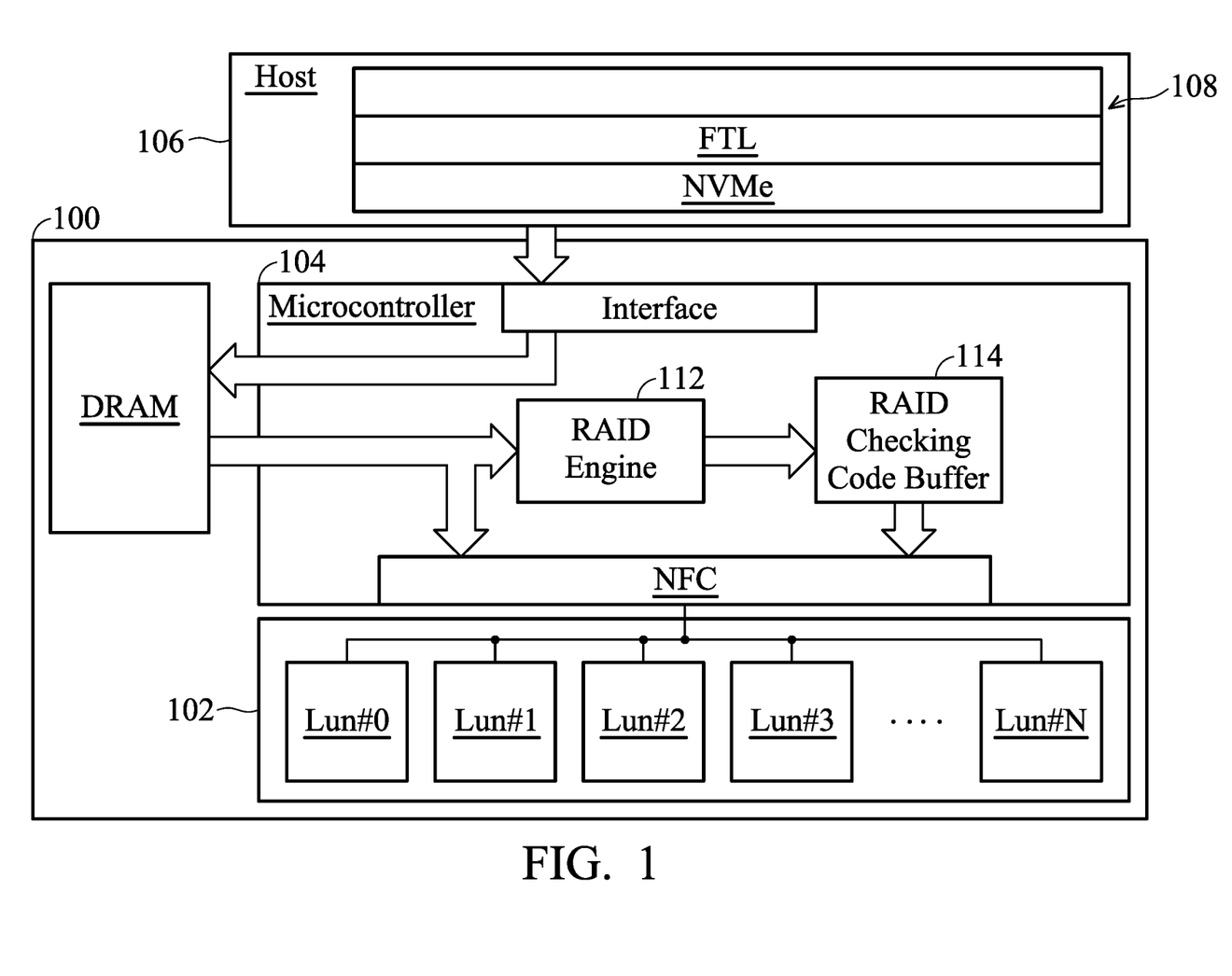
FIG. 1 is a block diagram depicting a data storage device 100 in accordance with an exemplary embodiment of the disclosure.

FIG. 1 is a block diagram depicting a data storage device 100 in accordance with an exemplary embodiment of the disclosure. The data storage device 100 has a flash memory 102, a microcontroller 104 and a volatile memory (e.g. a dynamic random access memory DRAM). A host 106 is connected to the data storage device 100 to access the flash memory 102 by operating the controller 104 with using the DRAM for temporary storage of information. For cost considerations, the data storage device 100 may not be equipped with a DRAM and the DRAM function may be replaced by static random access memory (SRAM) built in the microcontroller 104.

The present invention may adopt an open channel architecture, in which the mapping table L2P may be established and managed by the host 106. In addition to assign a logical address to user data, the host 106 determines a physical address (a target physical address) corresponding to the logical address for storage of the user data. The host 106 may also determine a physical address (a reserved physical address) to store the RAID checking code to the data storage device. A non-volatile memory express (NVMe) interface is established by a driver 108 at the host 106 side to communicate with the microcontroller 104, and a flash translation layer (FTL) is established at the host 106 side to manage the mapping tables L2P and P2L. The microcontroller 104 includes a NAND flash controller (NFC) controlling the operations of the flash memory 102 and further includes a RAID engine 112 and a RAID checking code buffer 114 (e.g. a parity buffer). In another embodiment, the flash translation layer (FTL) managing the mapping tables L2P and P2L is established at the microcontroller 104 side. The flash translation layer (FTL) provides a copy of the mapping table L2P to the host 106.

The microcontroller 104 may operate the flash memory 102 through multiple channels. The storage space corresponding to each channel may be divided into several areas which are driven separately by different chip enable (CE) signals. The microcontroller 104 may organize the storage space of the flash memory 102 in a specific way. For example, the LUNs/blocks/pages on the different channels may form stripes of storage space for building a RAID system. Each stripe stores user data (sectors of user data) with the corresponding RAID checking code.

Figure 2:
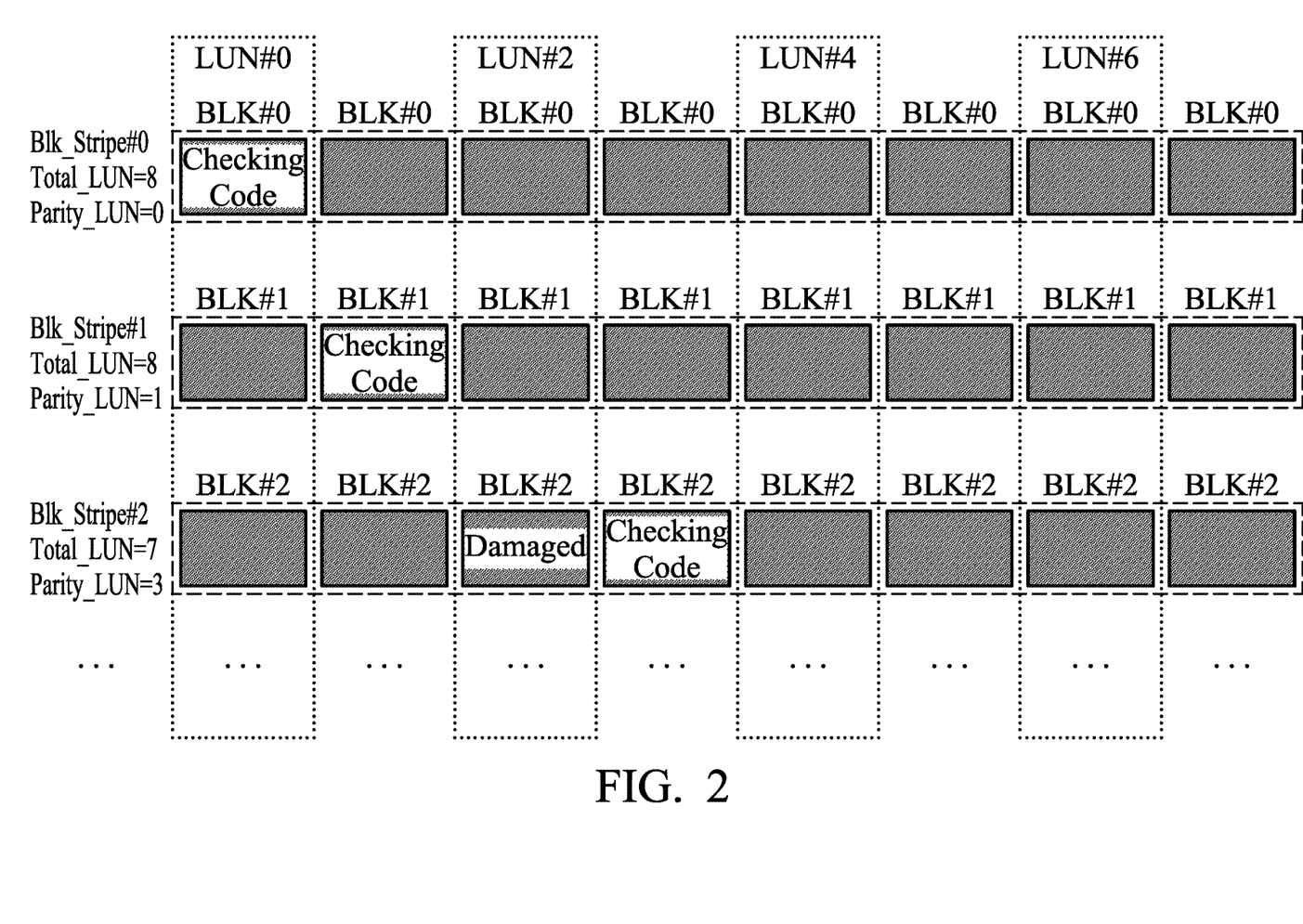
FIG. 2 depicts a RAID system in accordance with an exemplary embodiment of the disclosure.

As shown in FIG. 2, the flash memory 102 includes eight areas corresponding to eight different logical unit numbers (LUNs), which are LUN#0, LUN#1, LUN#2, LUN#3 . . . LUN#7. Each LUN preferably corresponds to the same number of blocks, for example, 1024 blocks. The blocks preferably have the same number of pages, for example, 512 pages. The pages preferably are in the same size, for example, 16 KB. Each stripe of blocks (i.e. block stripe, Blk_Stripe) may be formed by the blocks of the same block number of the different LUNs. For example: the block stripe Blk_Stripe#0 includes eight BLK#0 blocks of the different LUNs LUN#0~#7. In another exemplary embodiment, the size of a block stripe is smaller. A stripe of blocks, Blk_Stripe, may just involve a part of the LUNs. For example, a block stripe Blk_Stripe#10 includes the BLK#10 blocks of four LUNs LUN#0~#3 while another block stripe Blk_Stripe#11 includes the BLK#11 blocks of four LUN#4~#7. A block BLK of a selective LUN within a block stripe Blk_Stripe may be regarded as a RAID checking block for storage of the RAID checking code.

A stripe of blocks, Blk_Stripe, may include stripes of pages (e.g. page stripes, each is P_Stripe). For example, each block stripe Blk_Stripe may include 512 page stripes. Each page stripe P_Stripe includes pages of the same page number in the corresponding stripe of blocks Blk_Stripe. For example, the page stripe P_Stripe#0 includes eight #0 pages in the block stripe Blk_Stripe#0. Considering the operation characteristics of flash memory, the RAID storage is erased in the units of the block stripe Blk_Stripe and is accessed in the units of the page stripe P_Stripe. To write data into the flash memory, a block stripe Blk_Stripe is selected first and then user data and the corresponding RAID checking code are written into the selected block stripe Blk_Stripe in the units of the page stripe P_Stripe. When all page stripes P_Stripe in the selected block stripe Blk_Stripe have been filled with data, the host 106 selects another block stripe Blk_Stripe to store any further user data. The above structure is only convenient for explaining the case, but it is not limited to this.

The user data from the host 106 is successively stored to the DRAM by the microcontroller 104. When the accumulated user data in the DRAM reaches a predetermined amount (for example, four sectors of user data or one page of user data) or a data collection time is reached, the microcontroller 104 reads the user data from the DRAM to be programmed to the flash memory 102 by the NFC. The user data acquired from the DRAM is further passed to the RAID engine 112 for XOR calculations. RAID checking code is generated and buffered in the RAID checking code buffer 114.

According to commands from the host 106, the microcontroller 104 operates the NFC to program the RAID checking code buffered in the RAID checking code buffer 114 to the flash memory 102. When the user data is programmed to the flash memory 102 in accordance with the physical address (target physical address) specified by the host 106, the mapping between logical and physical addresses of the user data is updated to the mapping tables L2P and P2L. When the RAID checking code is programmed to the flash memory 102 in accordance with the reserved physical address, the mapping between logical and physical addresses of the RAID checking code is updated to the mapping table P2L and it is not necessary to manage the mapping in the mapping table L2P. In an exemplary embodiment, the host 106 determines that the RAID checking code is of a reserved logical address, e.g. 0XFFFF. In another exemplary embodiment, the logical address of the RAID checking code is indicated by a block stripe (BLK_Stripe) number or a page stripe (P_Stripe) number. User data and the corresponding RAID checking code are stored to one page stripe P_Stripe. The RAID checking code is stored to the page specified by a reserved physical address in the page stripe P_stripe.

In another embodiment, the microcontroller 104 outputs the user data and the corresponding RAID checking code to the NFC together, and the user data and the corresponding RAID checking code are programmed to the flash memory 102 together by the NFC.

In the present invention, a RAID encoding initialization command RAID_Parity_Init and a RAID checking code programming command RAID_Parity_Out are defined in the non-volatile memory express interface NVMe of the host 106. The RAID encoding initialization command RAID_Parity_Init is used to reset the RAID engine 112 and the RAID checking code buffer 114. A parity LUN Parity_LUN is indicated by the RAID encoding initialization command RAID_Parity_Init to specify a RAID checking block in the flash memory 102. The pages of the block specified by the parity LUN Parity_LUN are allocated to store the RAID checking code, and the reserved physical address for the RAID checking code may be represented by a page address. Using the RAID checking code programming command RAID_Parity_Out, the microcontroller 104 programs the RAID checking code buffered in the RAID checking code buffer 114 to the page of the RAID checking block indicated by Parity_LUN. The host 106 operates the microcontroller 104 to generate and program the RAID checking code to the flash memory 102 by issuing the RAID encoding initialization command RAID_Parity_Init and the RAID checking code programming command RAID_Parity_Out.

Figure 3:
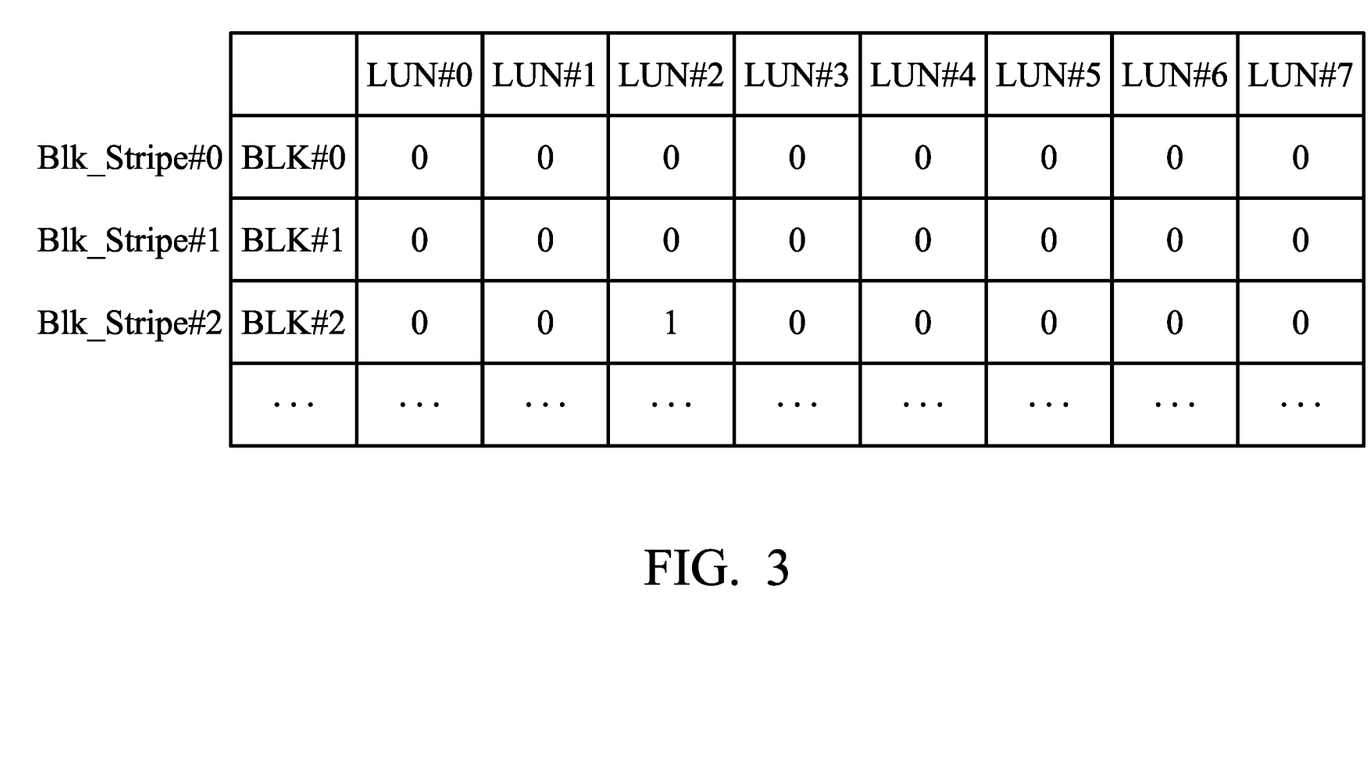
FIG. 3 depicts a block status table in accordance with an exemplary embodiment of the disclosure.

Considering the damaged blocks of the flash memory 102, the RAID encoding initialization command RAID_Parity_Init preferably further indicates a total number of available LUNs Total_LUN (or number of available LUNs) of the indicated block stripe Blk_Stripe. Referring to FIG. 2, the BLK#0 blocks of all LUNs #0~7 operate normally. In FIG. 3, all BLK#0 blocks are marked by '0'. The host 106, therefore, uses the all BLK#0 blocks to form a block stripe Blk_Stripe#0 with the total number of available LUNs Total_LUN being 8. As shown, the parity LUN, Parity_LUN, is 0. BLK#0 of LUN#0 is allocated to store RAID checking code. According to the RAID checking code programming command RAID_Parity_Out, the microcontroller 104 provides the NFC with the RAID checking code. The NFC programs the RAID checking code to one page of BLK#0 indicated by the parity LUN Parity_LUN.

In the block stripe Blk_Stripe#2, the BLK#2 block of LUN#2 is damaged and is marked by '1' in the block status table of FIG. 3. The host 106, therefore, sets the number of available LUNs, Total_LUN, to be 7 and sets the parity LUN, Parity_LUN, to be 3. According to the RAID checking code programming command RAID_Parity_Out, the microcontroller 104 provides the NFC with the RAID checking code. The NFC programs the RAID checking code to one page of the BLK#2 block of the parity LUN LUN#3. The host 106 determines the values of Total_LUN and Parity_LUN based on the block status table of FIG. 3. Thus, the user data and the RAID checking code can be successfully programmed into one page stripe of the allocated block stripe Blk_Stripe.

When requesting to write user data, the host 106 may use the RAID encoding initialization commands RAID_Parity_Init to indicate the same LUN, e.g. LUN#7, as the parity LUN. An algorithm similar to RAID-4 algorithm, therefore, works. In another exemplary embodiment, a remainder is calculated by dividing a block stripe (Blk_Stripe) number by 8. The parity LUN Parity_LUN is set as the calculated remainder. As shown in FIG. 2, the remainder calculated corresponding to the block stripe Blk_Stripe#0 is 0. The parity LUN, Parity_LUN, therefore, is 0. The remainder calculated corresponding to the block stripe Blk_Stripe#1 is 1. The parity LUN, Parity_LUN, therefore, is 1. The remainder calculated corresponding to the block stripe Blk_Stripe#2 is 2. The initial value of parity LUN, Parity_LUN, therefore, is 2. An algorithm similar to RAID-5 algorithm, therefore, works. In theory, storing the RAID checking code by indefinite LUN can improve the bandwidth of reading data from the flash memory 102. Therefore, the present invention is preferably storing data according to a RAID-5 algorithm, but not limited thereto.

The microcontroller 104 may further take the number of available LUNs, Total_LUN, into consideration during the generation of RAID checking code. The microcontroller 104 decrements the number of available LUNs (Total_LUN) by one each time the microcontroller 104 outputs a preset amount of user data to the RAID engine 112 to calculate (or update) the RAID checking code. When receiving the RAID checking code programming command RAID_Parity_Out, the number of available LUNs (Total_LUN) should be 1. If not, it means that the host 106 does not provide a sufficient amount or provides an excessive amount of user data to the microcontroller 104. The microcontroller 104 reports the host 106 an error message, and the host 106 manages the error subsequently.

Figure 4:
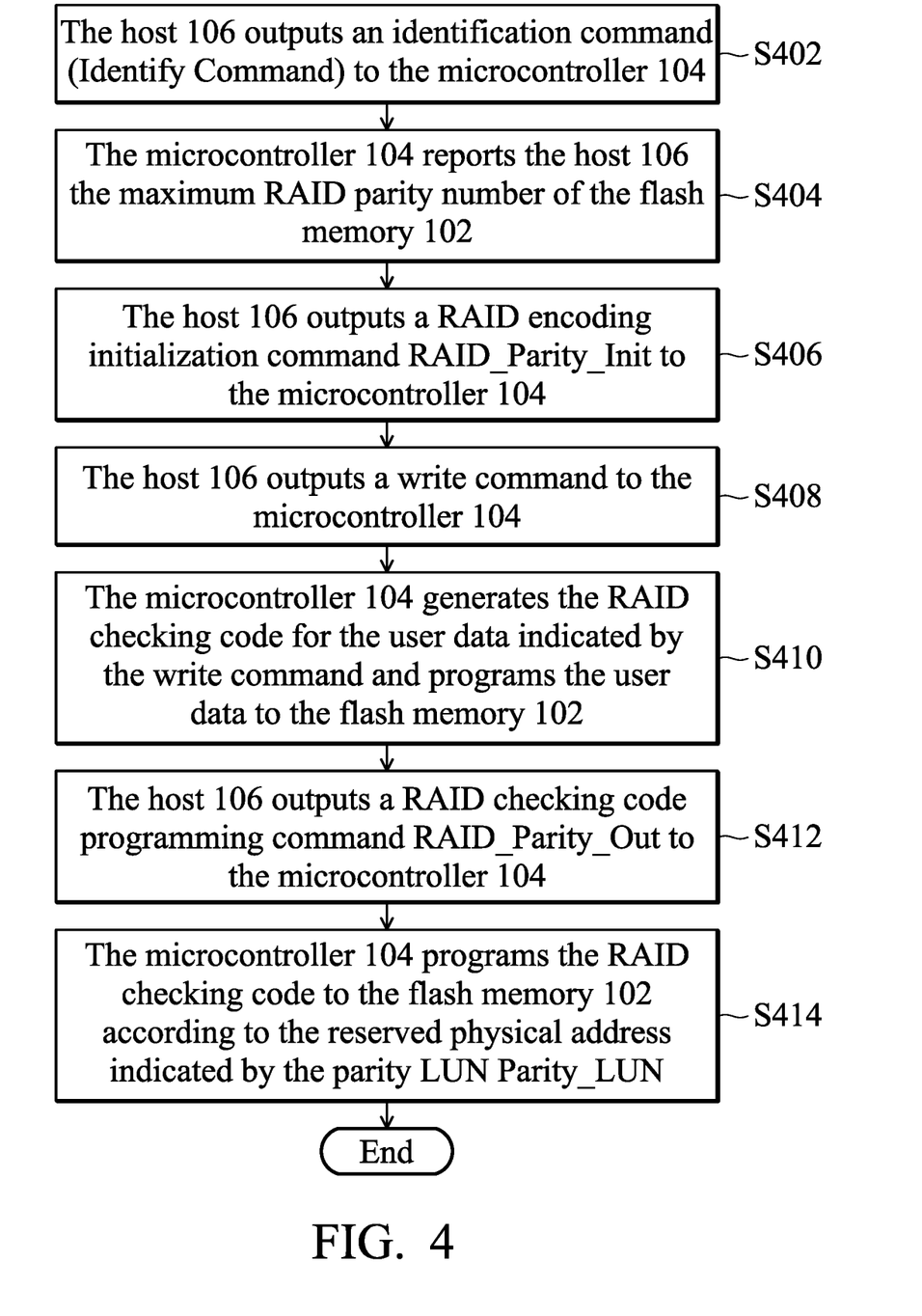
FIG. 4 is a flow chart depicting a method for the host 106 to perform a data write operation on the data storage device 100 in accordance with an exemplary embodiment of the present invention.

FIG. 4 is a flow chart depicting a method for the host 106 to perform a data write operation on the data storage device 100 in accordance with an exemplary embodiment of the present invention. In step S402, the host 106 outputs an identification command (Identify Command) to the microcontroller 104 of the data storage device 100.

In step S404, in response to the identification command (Identify Command), the microcontroller 104 reports the host 106 the maximum RAID parity number of the flash memory 102 and a set of control parameters. The maximum RAID parity number means the amount of LUNs involved by each block stripe Blk_Stripe. In an exemplary embodiment, the flash memory 102 is operated through four channels and each channel corresponds to two CE signals. A total number of LUSs is eight (LUN#0~#7). Thus, the maximum RAID parity number is 8. The microcontroller 104 may further return the host 106 a block status table, which lists the block numbers of the damaged blocks or the status (good or damaged) of each block. The host 106 receives and preferably maintains the block status table.

In step S406, the host 106 outputs a RAID encoding initialization command RAID_Parity_Init to the microcontroller 104. The RAID encoding initialization command RAID_Parity_Init includes information about the number of available LUNs, Total_LUN, and the parity LUN Parity_LUN. The host 106 sets the number of available LUNs, Total_LUN, as the maximum RAID parity number to be processed by the microcontroller 104, wherein the size of each block stripe Blk_Stripe depends on the maximum RAID parity number which shows the number of LUNs that the block stripe Blk_Stripe involves. For example, each block stripe Blk_Stripe may involve 8 LUNs. The parity LUN Parity_LUN is a LUN number. In an example, the parity LUN Parity_LUN of the block stripe Blk_Stripe#0 is 0. The RAID checking code is stored in BLK#0 block of LUN#0 when the user data is stored by the other seven BLK#0 blocks of LUN#1~#7. More precisely, the RAID checking code is stored in pages P#0~P#511 of the BLK#0 block of LUN#0 when the user data is stored by pages P#0~P#511 of the other seven BLK#0 blocks of LUN#1~#7.

When the parity LUN Parity_LUN obtained by the remainder (Mod) calculation indicates a damaged block, the microcontroller 104 may directly decrement the number of available LUNs, Total_LUN, by one and modify the parity LUN Parity_LUN (e.g. adding 1 as FIG. 2 or decreasing 1) to skip the damaged block.

Furthermore, upon receiving the RAID encoding initialization command RAID_Parity_Init from the host 106, the microcontroller 104 resets the RAID engine 112 and the RAID checking code buffer 114, and records number of available LUNs, Total_LUN, and the parity LUN Parity_LUN.

In step S408, the host 106 outputs a write command to the microcontroller 104 of the data storage device 100. The write command indicates user data and a target physical address. Each patch of user data preferably corresponds to one target physical address. The target physical address is preferably a physical address of one page stripe P_Stripe of one block stripe Blk_Stripe.

In step S410, the microcontroller 104 generates the RAID checking code for the user data indicated by the write command and programs the user data to the flash memory 102. After acquiring the user data (and obtaining the target physical address) according to the write command, the microcontroller 104 operates the NFC to program the user data to the flash memory 102 according to the target physical address. For example, when the current target space is the page stripe P_Stripe#0 of the block stripe Blk_Stripe#0, the acquired user data is programmed to the P#0 pages of the BLK#0 blocks of LUN#1~#7. The P#0 page of the BLK#0 block of LUN#0 is reserved for the RAID checking code which is generated by the RAID engine 112. In another exemplary embodiment, the microcontroller 104 temporarily stores the user data in the DRAM. When the user data is accumulated to a predetermined amount or exceeds the data collection period, the microprocessor 114 operates the NFC to program the user data to the target physical address of the flash memory 102 and operates the RAID encoding engine 112 to generate the corresponding RAID checking code based on the user data. Each time the RAID engine 112 updates the RAID checking code for the target page stripe, the microcontroller 104 decrements the number of available LUNs, Total_LUN, by one.

In step S412, the host 106 outputs a RAID checking code programming command RAID_Parity_Out to the microcontroller 104. When receiving the RAID checking code programming command RAID_Parity_Out from the host 106, the microcontroller 104 first confirms whether the value of the available LUNs (Total_LUN) is 1. If not, this means that the host 106 does not provide the proper amount of user data to the microcontroller 104. The microcontroller 104 reports the host 106 an error message, and the host 106 performs the subsequent error management.

In step S414, the microcontroller 104 programs the RAID checking code to the flash memory 102 according to the reserved physical address indicated by the parity LUN Parity_LUN transmitted through the RAID encoding initialization command. The reserved physical address points to a page of a page stripe P_Stripe corresponding to the parity LUN Parity_LUN. In an exemplary embodiment, the page stripe P_Stripe#0 of the block stripe Blk_Stripe#0 is selected as the target space. When the host 106 outputs the RAID checking code programming command RAID_Parity_Out to the microcontroller 104, the microcontroller 104 programs the RAID checking code generated by the RAID engine 112 to P#0 page of BLK#0 block of LUN#0. The writing on the page stripe P_Stripe#0 of the block stripe Blk_Stripe#0 completes with the storage of the RAID checking code. After writing the page stripe P_Stripe#0, the host 106 starts data writing on the page stripe P_Stripe#1 of the block stripe Blk_Stripe#0.

The order of data writing operations on a block stripe Blk_Stripe is preferably in the order of LUN numbers, but not limited thereto. For example, to write data to the block stripe Blk_Stripe#1, the user data may be programmed to the BLK#1 blocks in the order of LUN#2→LUN#3→LUN#4→LUN#5→LUN#6→LUN#7→LUN#0. The RAID checking code is programmed to block Blk#1 of LUN#1. In another exemplary embodiment, user data is written to the BLK#1 blocks in the order of LUN#0→LUN#2→LUN#3→LUN#4→LUN#5→LUN#6→LUN#7, and the RAID checking code is programmed to block Blk#1 of LUN#1. In another exemplary embodiment, data writing on the different LUNs depends on the ready status of each channel. An interleaving way is possible.

The physical address is preferably indicated by a channel number, a LUN number, a block (stripe) number, and a page (stripe) number. The target physical address allocated to the user data and the reserved physical address reserved for RAID checking code have the same block (stripe) number and page (stripe) number. In an exemplary embodiment, there are 8 LUNs available to user data storage. A RAID encoding initialization command RAID_Parity_Init indicates the available LUN number, 8. The block stripe Blk_Stripe includes four channels numbered from 0 to 3 and each corresponds to a pair of chip enable signals CE#0 and CE#1. Thus, eight LUNs, LUN#0~7, are provided. When the target block stripe Blk_Stripe is selected, the block (stripe) number used in the different LUNs is selected. For example, when the target block stripe is Blk_Stripe#1, the Blk#1 blocks (with a block number which is 1) are used in the different LUNs. When the target page stripe P_Stripe is selected, the page (stripe) number used in the target blocks of the different LUNs is selected. For example, when the target page stripe is P_Stripe#2, the Page#2 pages (with a page number which is 2) in the target blocks of the different LUNs are used. When the parity LUN Parity_LUN is 0, the reserved physical address reserved for the RAID checking code may be Page#2 page of BLK#1 block of LUN#0 controlled by CE#0 through the channel #0. Physical addresses indicating the other areas of the page stripe P_Stripe#2 (i.e. the physical addresses pointing to the P#2 pages of the BLK#1 blocks of the other LUNs) are the target physical address allocated to the user data. As the aforementioned discussion, the target physical address allocated to the user data and the reserved physical address reserved for RAID checking code have the same block (stripe) number and page (stripe) number.

In the aforementioned discussion, the minimum unit for data management is page. In another exemplary embodiment, each page is further divided into a plurality of sectors. The microcontroller 104 may manage data in the sector unit rather than in the page unit. A target physical address, therefore, includes a sector address (or an offset value). In an exemplary embodiment, the size of one page is 16 KB, the size of one sector is 4 KB, and each page includes 4 sectors. A page stripe P_Stripe#0 of a block stripe Blk_Stripe#0 may be allocated to store 28 sectors of user data. The RAID engine 112 preferably encodes the user data of the page size to generate the corresponding RAID checking code to increase the speed of the RAID encoding. In another exemplary embodiment, the RAID engine 112 encodes the user data of the same sector number in the different LUNs to generate one sector of RAID checking code, and programs the generated sector of RAID checking code to one sector (having the same sector number with the corresponding user data) of the parity LUN (Parity_LUN) in the page stripe P_Stripe#0.

After completing the data write operation, the host 106 can initiate a data read operation to read user data from the data storage device 100. When the user data is damaged or lost, the user data is repaired by RAID checking code. The host 106 knows the physical address of the damaged user data. The position of the corresponding RAID checking code is estimated based on the parity LUN Parity_LUN, the block stripe (Blk_Stripe) number, and the page stripe (P_Stripe) number. Accordingly, the RAID checking code of the damaged or lost user data is repaired. Since the method of data restoration is not the focus of this invention, it is not explained.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a microcontroller, including a redundant array of independent disks (RAID) engine that encodes user data to generate RAID checking code,
wherein:
the user data is indicated by a write command;
the microcontroller programs the user data to the non-volatile memory according to a target physical address indicated by the write command, and the microcontroller checks whether number of available logical unit numbers (LUNs) is a preset value and, if yes, the microcontroller programs the RAID checking code to the non-volatile memory according to a reserved physical address; and
the user data and the RAID checking code are programmed to a stripe of pages of a stripe of blocks.

2. The data storage device as claimed in claim 1, wherein the write command is requested by a host.

3. The data storage device as claimed in claim 1, wherein the reserved physical address is determined based on a RAID encoding initialization command from a host.

4. The data storage device as claimed in claim 1, wherein the microcontroller programs the RAID checking code to the non-volatile memory according to the reserved physical address in response to a RAID checking code programming command.

5. The data storage device as claimed in claim 1, wherein the microcontroller further comprises a RAID checking code buffer for temporary storage of the RAID checking code.

6. The data storage device as claimed in claim 1, wherein the user data is accumulated to be programmed to the non-volatile memory with the RAID checking code.

7. The data storage device as claimed in claim 1, wherein the user data and the RAID checking code are sequentially programmed to the non-volatile memory.

8. A data writing method, comprising:
receiving a write command;
generating redundant array of independent disks (RAID) checking code for user data indicated by the write command;
programming the user data to a non-volatile memory according to a target physical address indicated by the write command;
receiving a RAID checking code programming command; and
in response to the RAID checking code programming command, checking whether the number of available logical unit numbers (LUNs) is a preset value and, if yes, programming the RAID checking code to the non-volatile memory according to a reserved physical address,
wherein the user data and the RAID checking code are programmed to a stripe of pages of a stripe of blocks.

9. The data writing method as claimed in claim 8, wherein the reserved physical address is determined based on a RAID encoding initialization command.

10. The data writing method as claimed in claim 8, wherein the user data is accumulated to be programmed to the non-volatile memory with the RAID checking code.

11. The data writing method as claimed in claim 8, wherein the user data and the RAID checking code are sequentially programmed to the non-volatile memory in separated time points.

12. The data writing method as claimed in claim 8, wherein:
   the number of available LUNs is indicated by a RAID encoding initialization command.

13. The data writing method as claimed in claim 8, further comprising:
   outputting a block status table in response to an identification command.

* * * * *